United States Patent
Adar et al.

(10) Patent No.: US 8,667,103 B2
(45) Date of Patent: *Mar. 4, 2014

(54) SYSTEM AND METHOD FOR MESSAGE TRAFFIC ANALYSIS, CATEGORIZATION, AND REPORTING, WITHIN A SYSTEM FOR HARVESTING COMMUNITY KNOWLEDGE

(75) Inventors: Eytan Adar, Palo Alto, CA (US); Rajan Mathew Lukose, Palo Alto, CA (US); Caesar Sengupta, Los Altos, CA (US); Joshua Rogers Tyler, Stanford, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2699 days.

This patent is subject to a terminal disclaimer.

(21) Appl. No.: 10/133,617

(22) Filed: Apr. 26, 2002

(65) Prior Publication Data

US 2003/0204581 A1    Oct. 30, 2003

(51) Int. Cl.
G06F 15/173    (2006.01)

(52) U.S. Cl.
USPC .......................................................... 709/223

(58) Field of Classification Search
USPC .......................................................... 709/223
See application file for complete search history.

(56) References Cited

U.S. PATENT DOCUMENTS

| 6,009,462 | A |   | 12/1999 | Birrell |     |
|-----------|---|---|---------|---------|-----|
| 6,029,164 | A |   | 2/2000  | Birrell |     |
| 6,092,101 | A |   | 7/2000  | Birrell |     |
| 6,154,783 | A | * | 11/2000 | Gilmour et al. | 709/245 |
| 6,701,362 | B1 | * | 3/2004 | Subramonian et al. | 709/224 |
| 6,915,284 | B2 | * | 7/2005 | Adar et al. | 706/45 |
| 7,039,701 | B2 | * | 5/2006 | Wesley | 709/224 |
| 2002/0073137 | A1 | * | 6/2002 | Meadway et al. | 709/201 |
| 2002/0162025 | A1 | * | 10/2002 | Sutton et al. | 713/201 |
| 2003/0009448 | A1 | * | 1/2003 | Covington et al. | 707/3 |

OTHER PUBLICATIONS

Pending Patent Application entitled: "System and Method for Harvesting Community Knowledge" U.S. Appl. No. 10/093,658, filed Mar. 7, 2002. Inventors: Eytan Adar et al.
Webmaster World.com—pp. 1-4 "Google Acquires Outride.com"—Sep. 20, 2001.
WWW.Google.Com—pp. 1-2—"Google Acquires Technology Assets of Outride Inc." Press Release of Sep. 20, 2001.
Adriana Vivacqua & Henry Lieberman—"Agents to Assist in Finding Help"—2000—pp. 65-72.
Webpage—Gnutella "http://gnutella.wego.com/"—a widely known peer-to-peer-network.
Webpage—Freenet "http://freenet.sourceforge.net/"—peer-topeer architecture for file sharing.
Mark S. Ackerman & David W. McDonald—"Answer Garden 2: Merging Organizational Memory eith Collaborative Help"—1996—pp. 97-105.
David W. McDonald & Mark S. Ackerman—"Expertise Recommender: A Flexible Recommendation System and Architecture"—Dec. 2000—pp. 231-240.

(Continued)

*Primary Examiner* — Kenny Lin
*Assistant Examiner* — Farhad Ali (57) ABSTRACT

A system and method for knowledge management is disclosed. The method discloses: monitoring messages transmitted over a peer-to-peer network; profiling the messages; receiving a messages report request; identifying message profiles corresponding to the message report request; selecting messages corresponding to the identified message profiles; and generating the requested messages report from the selected messages. The system discloses means for implementing the method.

14 Claims, 5 Drawing Sheets

(56) References Cited

OTHER PUBLICATIONS

Leonard N. Foner—"Yenta: A Multi-Agent, Referral-Based Matchmaking System"—1997—pp. 301-307.

Nathaniel S. Borenstein—"Computational Mail as Network Infrastructure for Computer-Supported Cooperative Work"—Nov. 1992—pp. 67-74.

Michael K. Reiter and Aviel D. Rubin—"Crowds: Anonymity for Web Transaction"—pp. 1-23.

Dawit Yimam-Seid & Alfred Kobsa—"Expert Finding Systems for Organizations: Problem and Domain Analysis and the DEMOIR Approach"—pp. 1-23.

WWW.Mercado.com—pp. 1-3 "Outride Unveils Mission: Make Internet, Corporate Intrane More Relevant, Personal—Announces Relationships with Excite@home, Inktomi & Mercado Software"—Press Release of Dec. 5, 2000.

WWW.thestreet.com—pp. 1-2—"Xerox Pushes GroupFire Out of the Start-Up Incubator"—Tish Williams—Sep. 19, 2000.

WWW.nwfusion.com—pp. 1-2—Xerox Spinoff Touts Service for Better Web—Jan. 31, 2000 Carolyn Duffy Marsan.

Webpage—The Crowds research project at AT&T Labs—"http://www.research.att.com/projects/crowds/"—creates anonymous web transactions by routing requests through a peer-to-peer network in a randomized way.

Expert-finding systems (such as www.exp.com, www.keen.com)—enable individuls to find experts to answer questions.

Xerox PARC spinoff company Groupfire software, enables users to search through their web or email archives; later became www.outride.net which was then acquired by www.google.com.

* cited by examiner

SYSTEM AND METHOD FOR MESSAGE TRAFFIC ANALYSIS, CATEGORIZATION, AND REPORTING, WITHIN A SYSTEM FOR HARVESTING COMMUNITY KNOWLEDGE

CROSS-REFERENCE TO CO-PENDING APPLICATIONS

This application relates to co-pending U.S. patent applications: Ser. No. 10/106,096 filed Mar. 25, 2002; Ser. No. 10/122,490 filed Apr. 12, 2002; Ser. No. 10/210,331 filed Jul. 31, 2002; Ser. No. 10/210,593 filed Jul. 31, 2002; Ser. No. 10/262,717 filed Oct. 2, 2002 and issued as U.S. Pat. No. 7,246,121; Ser. No. 10/093,658 filed Mar. 7, 2002; Ser. No. 10/133,617 filed Apr. 26, 2002; Ser. No. 10/448,032 filed May 28, 2003; Ser. No. 10/125,829 filed Apr. 18, 2002 and issued as U.S. Pat. No. 6,915,284; Ser. No. 10/184,414 filed Jun. 27, 2002. These related applications are assigned to Hewlett-Packard Co. of Palo Alto, Calif.

BACKGROUND OF THE INVENTION

1. Field of the Invention

The present invention relates generally to systems and methods for information sharing and knowledge management, and more particularly for searching for and analyzing previously transmitted messages within a system for harvesting community knowledge.

2. Discussion of Background Art

Satisfying information needs in a diverse, heterogeneous information environment is challenging. In order to even approach the process of finding information resources or answers to questions, individuals typically must know either where to look, or whom to ask. This is a challenging task, especially in large enterprises where many of the members are unaware of each other's skill sets, and of all the information resources available to them.

Such challenges become ever more significant, as modern enterprises realize that their value and strength as ongoing ventures depends increasingly upon an ability of their members to easily share information. For example, individual members of an enterprise may have questions that need answered, or may need to come up to speed on particular areas of knowledge before beginning their new assignment. The enterprise itself may also need to access its strengths and weaknesses in various product, services, and research areas. Unfortunately however, meeting these information needs is often an elusive goal for many enterprises.

Current systems for storing information and/or organizational expertise include Knowledge Databases (K-bases), such as document repositories and corporate directories, and Knowledge Management systems, which rely on users to explicitly describe their personal information, knowledge, and expertise to a centralized K-base.

Figure 1:
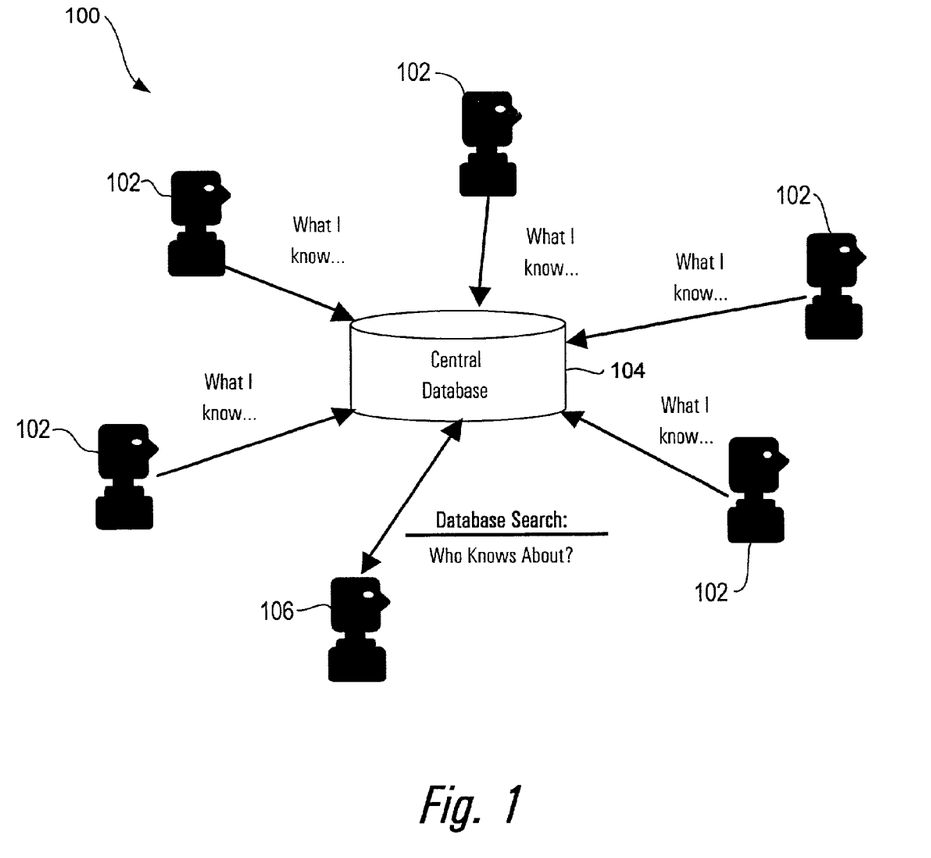
FIG. 1 is a dataflow diagram of a conventional knowledge management system.

FIG. 1 is a dataflow diagram of a conventional knowledge management system 100. In a typical architecture, information providing users 102 explicitly decide what descriptive information they provide to a central database 104. An information seeking user 106 then performs a query on the central database 104 in order to find an information provider who perhaps may be able to answer the seeker's question.

There are several significant problems with such systems. Knowledge management systems, like that shown in FIG. 1, require that information providers spend a significant amount of time and effort entering and updating their personal information on the central database 104. For this reasons alone, such systems tend to have very low participation rates. In addition, even information providers, who take time to enter and update their information, may accidentally or purposefully misrepresent their personal information, levels of knowledge, and expertise. Furthermore, they may neglect or be unable to reveal much of their tacit knowledge. Tacit knowledge is commonly known as knowledge a user possesses, but which the user considers trivial, or may not even be consciously aware of.

Because of the inaccuracy and/or incompleteness of such personal information, information seekers, even after all of their searching efforts, may still find their questions left unanswered, perhaps because the "expert" they identified may not have the bandwidth to respond, or may have been asked same question so that they, out of frustration or boredom, stop responding.

Frequently Asked Questions (FAQ) generation within organizations is another information management problem area, which is often very time consuming and costly. As one example, most new employee's would find a FAQ list directed just to new employees very helpful. However, enterprises tend to generate such FAQs in very time consuming and inaccurate ways, such as by surveying selected employees as to what information they would have liked to know when they started work, or by just speculating as to what a new employee would perhaps want to know. As another example, an enterprise's IT department tasked with installing new hardware and/or software on the enterprise's network may be deluged with calls from all those affected. A FAQ on the installation might solve many of the problems which have arisen, however, by the time such a FAQ is created some weeks later, the installation has been completed and the problems are moot. These, however, are just two examples of FAQ generation problems. Most organizations in fact need a great number of diverse FAQs in order to operate more efficiently.

In response to the concerns discussed above, what is needed is a system and method for harvesting community knowledge that overcomes the problems of the prior art.

SUMMARY OF THE INVENTION

The present invention is a system and method for knowledge management. One embodiment of the method of the present invention includes: monitoring messages transmitted over a peer-to-peer network; profiling the messages; receiving a messages report request; identifying message profiles corresponding to the message report request; selecting messages corresponding to the identified message profiles; and generating the requested messages report from the selected messages.

The system of the present invention, includes all means for implementing the method.

These and other aspects of the invention will be recognized by those skilled in the art upon review of the detailed description, drawings, and claims set forth below.

DETAILED DESCRIPTION OF THE PREFERRED EMBODIMENT

Figure 2:
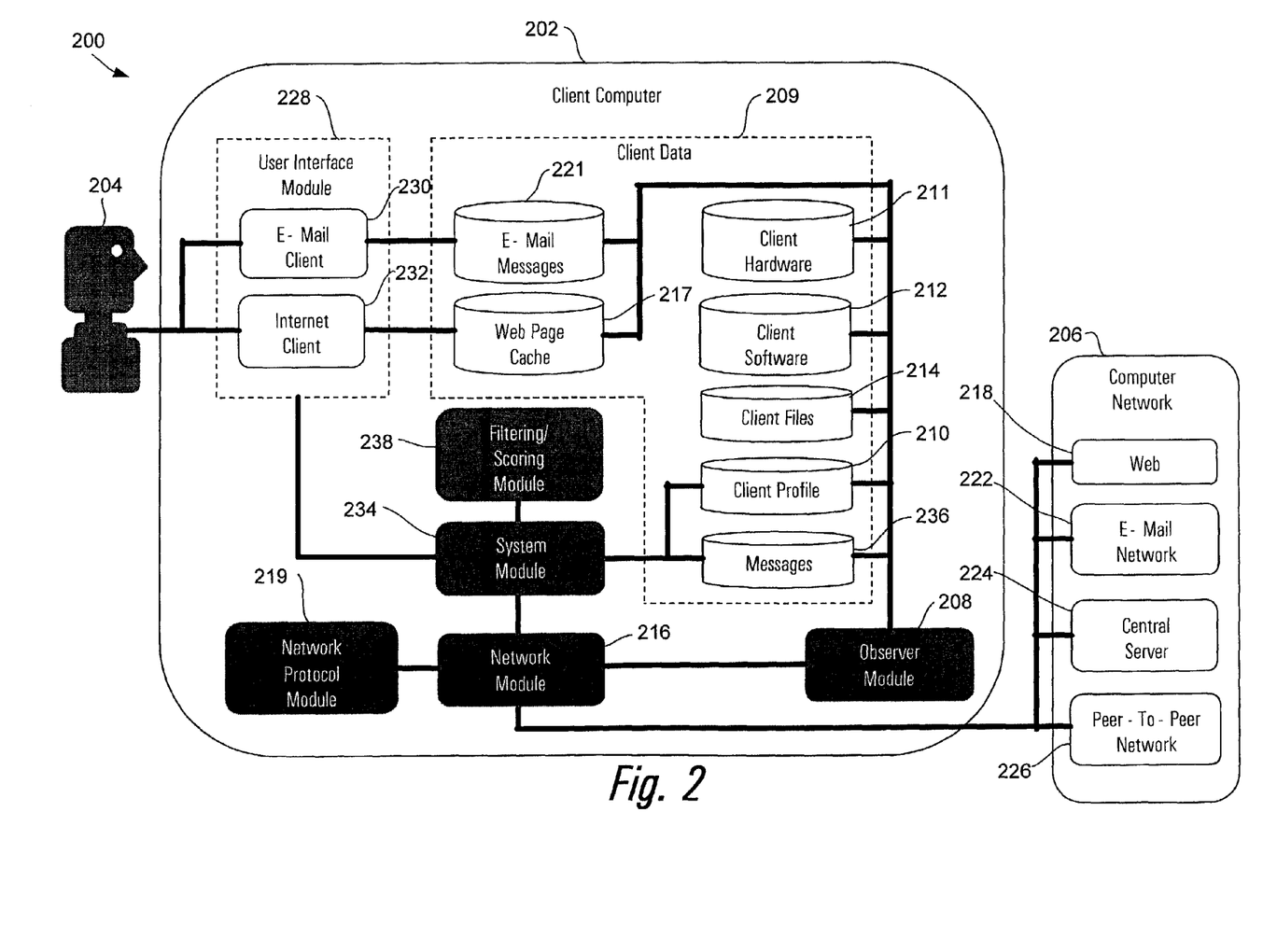
FIG. 2 is a dataflow diagram of one embodiment of a system for harvesting community knowledge.
Figure 3:
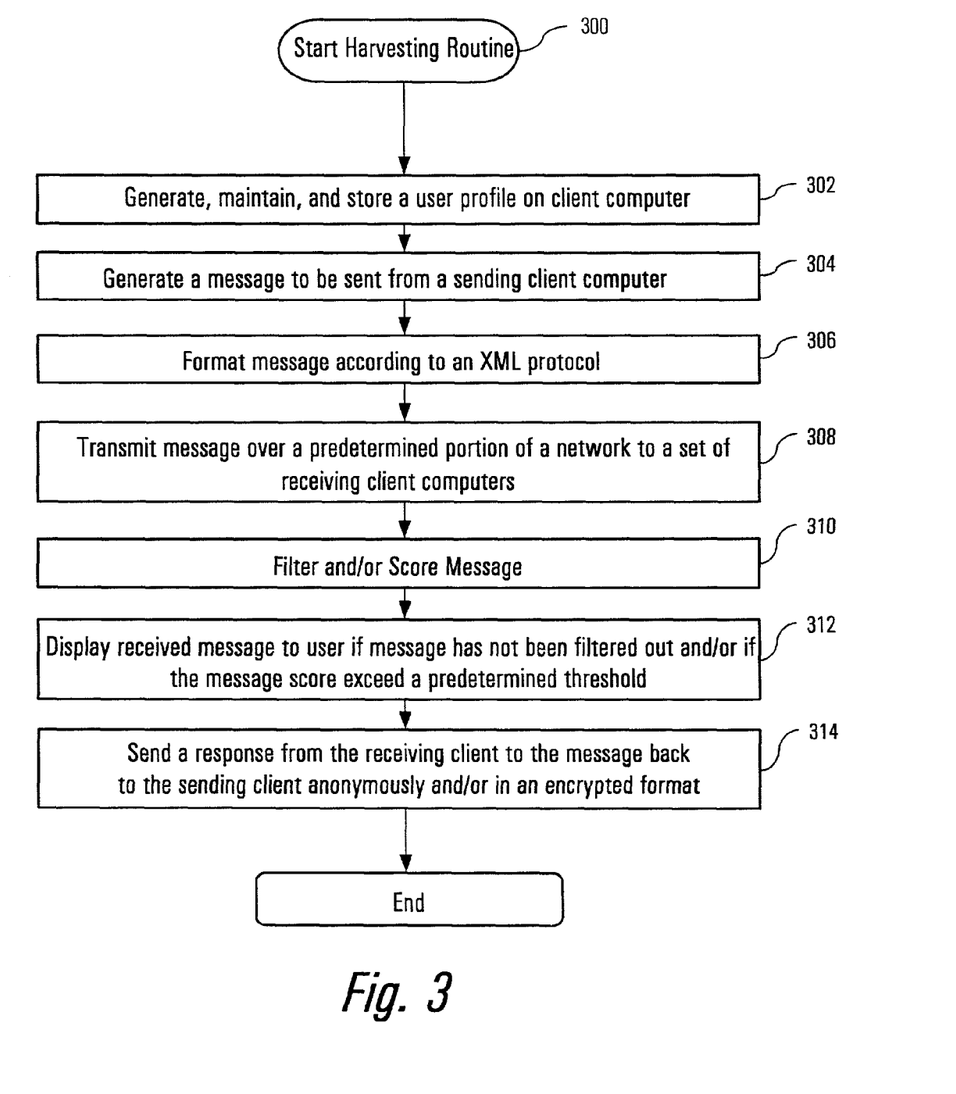
FIG. 3 is a flowchart of one embodiment of a method for harvesting community knowledge.

FIG. 2 is a dataflow diagram of one embodiment of a system 200 for harvesting community knowledge. FIG. 3 is a flowchart of one embodiment of a method 300 for harvesting community knowledge. FIGS. 2 and 3 are herein discussed together. The system 200 includes a client computer 202 under the control of a user 204, and connected to a computer network 206. The client 202 both sends and receives messages respectively to and from other client computers and information sources via the network 206. When a client computer generates and sends a message such client computer is herein alternately called a sending client, and when a client computer receives a message, such client computer is herein alternately called a receiving client. Preferably all client computers on the network include the same functionality, which is now described with respect to the client computer 202, however some receiving clients may not currently have the present invention's software installed.

User Profiling

The method 300 begins with an observer module 208 generating and maintaining a client profile 210 on the client computer 202, in step 302. The observer module 208 begins a process of generating and maintaining the client profile 210 by monitoring and collecting data with respect to both internal and external computer 202 information and operations. Internal data includes: user 204 behavior on the computer 202, installed client hardware 211, installed client software 212, and locally stored client files 214. External data includes: a web page cache 217 populated through internet client 232 interactions with web 218 sites, and e-mail messages 221 populated through e-mail client 230 interactions with an e-mail network 222. User operations, in addition to the term's normal meaning, is herein defined to include together or in the alternative: user behavior on the client computer 202; any information about the user; any information about the client computer 202; and/or any information about the computer's 202 interaction with the network 206.

During the monitoring process, selected data is captured, processed, and added to the client profile 210. The selected data is then automatically analyzed and formatted for storage in the client profile 210. Thus, the observer module 208 relieves the user 204 from having to manually describe themselves to other users on the network 206. This dramatically reduces the participation costs for all users of the present invention, while ensuring that the client profile 210 is constantly kept up to date. Thus the client profile 206, as generated and maintained by the present invention, serves as a very rich and detailed data structure for enabling the user 204 to efficiently and equitably participate in an information market.

In order to maximize the user's 204 privacy and thereby encourage broad user participation within the information market, the client profile 210 is preferably stored only on the client computer 202, however the profile 210 may also be stored remotely either in encrypted or password protected form and viewable only by the user 204. Also to toward this goal, the user 204 is also preferably given an option of erasing their client profile 210, or having the observer 208 rebuild a new client profile for the user 204.

Message Generation

Next to be described is a system and method for generating messages in step 304 using the present invention. Messages are herein defined to include a wide variety of communications known to those skilled in the art, including any communication seeking, sending, and/or culling information from an information market. Thus messages can include questions, announcements, and/or information processing routines.

To begin, the user 204 accesses a user interface module 228. The user interface module 228 preferably includes a set of software modules for interfacing with the user 204. Such modules at a minimum include the e-mail client 230, which stores a predetermined set of e-mail messages 221, and the Internet client 232, which stores information in the web page cache 217. These two modules 230 and 232 provide the user 204 with alternate ways of using the present invention and preferably, both contain similar functionality, such as text windows and folders for storing messages both sent and received.

Through the user interface module 228, the user 204 initiates the message generating process, such as by clicking on an "Ask a Question" button in a toolbar within the user interface. In response, the user interface module 228 displays a number of pre-defined message types to the user 204.

One message type example is a "Find an Expert" message. The find an expert message is likely to be one of the more popular questions asked by the user 204. The find an expert message includes a message field, an anonymous check box, and an optional filters field. The message field collects information provided by the user 204 which the user believes will help the present invention direct the message to receiving clients likely to be able to either answer the user's 204 question or be apprised of the user's 204 interest in some knowledge area and inviting further communication. The more detail the user 204 provides in the message field, the better directed will be the message to an appropriate set of receiving clients. The anonymous check box, if checked, directs the message to be sent only over a peer-to-peer network 226, using randomization, without any information explicitly identifying the user's identity. Users of the present invention are expected to direct a large amount of message traffic over the peer-to-peer network 226 in order to maintain their anonymity. The optional filters field permits the user 204 to target the message to a set of receiving clients satisfying one or more filtering conditions.

The network module 216 periodically scans the message database 236 for new messages generated by the user 204. Then in step 306, a network protocol module 219 formats the new message according to an XML (Extensible Markup Language) protocol for transmission by the network module 216 over the network 206. Both a client computer sending the message and a client computer receiving the message must be apprised of the particular XML protocol used to format the message, in order for communication to occur.

Preferably the peer-to-peer network 226 is limited to an enterprise's intranet so that only a predetermined set of client computers on the network 206 may have an opportunity to respond to the message. By limiting the scope of users allowed to see messages, a baseline level of confidentiality, expertise, and/or message response integrity may be maintained. For instance, the scope of users may be limited to only those who are employed within a particular enterprise, who belong to a particular professional society, or who are students and one or more universities. The exact scope of users will thus depend upon a particular application of the present invention.

In alternate embodiments, messages may be transmitted over global e-mail and/or web networks, but in an encrypted format which again limits the scope of users. In other embodiments, there may be no limits on the scope of users who may be given an opportunity to respond to the messages.

Message Transmission

Next in step 308, the network module 216 transmits the message over a predetermined portion of the computer network 206. Messages transmitted over the peer-to-peer network 226 achieve a high level of anonymity, however many messages will likely be transmitted over the e-mail network 222 or displayed on a web 218 site in order to advertise the present invention and thereby build-up the peer-to-peer network 226.

As mentioned above, when the computer client 202 transmits a message over the network 206 it is called a sending client, while when the computer client 202 receives a message over the network 206 it is called a receiving client. Thus in normal operation, all client computers function as both sending and receiving clients.

The present invention thus encourages a high level of participation and sharing of expertise by permitting users to maintain privacy and anonymity. User privacy is preserved by storing the user's 204 client profile 210 preferably only on the client computer 202 thereby encouraging users to permit the building of very rich profiles which go far beyond those users would otherwise voluntarily disclose to a central database. User anonymity is preserved by transmitting messages over the peer-to-peer network 226.

Message Filtering and Scoring

For purpose of the discussion to follow, functionality within the client computer 202 for processing received messages is discussed as if the client computer 202 was one of the receiving client computers. Such a context switch is appropriate because preferably each client computer contains a complete and self contained version of the present invention's software.

Thus in step 310, the system module 234 within the client computer 202 retrieves, and commands a filtering/scoring module 238 to filter and score, newly received messages which have been stored in the messages database 236.

In order to perform filtering and scoring, the filtering/scoring module 238 compares the message with information stored in the user's 204 client profile 210. If necessary however, the message may be compared with data stored elsewhere in the client computer 202, such as in the e-mail client 230, the e-mail messages 221, the internet client 232, the web page cache 217, the client software 212, the client files 214, and the client messages 236.

A received message is filtered by the filtering/scoring module 238 when such message contains a predetermined set of criteria, inserted by the message sending client, in order to target selected receiving clients. Such filtering criteria is preferably very flexible and is left at the discretion of the sending client user. For example, the filtering criteria may look for a particular data string, or at some other information within a receiving client's client profile 210.

In an alternate embodiment however, a client profile 210 which does not meet the filtering criteria merely results in a low message score. In this way, a message which does not meet the filtering criteria does not automatically prevent the user 204 from seeing the message. In such embodiments an overall weighted average score may be generated which depends upon not only all of the filtering criteria, but also the message's score. How the message's score is generated is discussed next.

The filtering/scoring module 238 preferably scores messages using statistical information retrieval techniques, including linguistic analysis. Information retrieval techniques are commonly known to be used for accessing and analyzing large blocks of data and then extracting all or selected portions of such data according to a wide variety of methods. Other techniques are also known to those skilled in the art.

While the above filtering and scoring discussion assumes the message was received over the peer-to-peer network 226, messages received over the e-mail network 222 as well as by other paths within the network 206 are similarly filtered and scored if the receiving client has the present invention's software installed.

For example, receiving clients who have the present invention's software already installed and have received an e-mail message containing an embedded XML message, have a copy of the embedded message placed in their messages database 236 so that the message can be filtered and scored. Receiving clients who do not have the present invention's software installed, however, only see the e-mail message in their standard e-mail inbox, and no other processing is performed.

Thus the filtering and scoring techniques of the present invention in combination with the rich client profiles stored on each receiving client's computer are together what enable messages to be brought to the attention of the right set of users.

Such intelligently targeted messaging, however, also builds user confidence in and reliance on the present invention. This is because unlike in conventional systems where users often have to wade though in-boxes full of junk or marginally useful e-mail, users using the present invention generally know and rely on the fact that their time will not be wasted on such unimportant messages. Instead users of the present invention will be even more likely to timely respond to messages received because the messages will be so on-point to their expertise and/or interests.

For example, in the past when a sending client needed to identify appropriate participants to participate in an experiment, or submit papers for a seminar, the user would clumsily post an advertisement on a web or other site, and/or send out a generalized e-mail to a very large distribution list. In such cases, targeted users often miss the importance of or are annoyed by such communications which are buried in a sea of information they already are trying to sift through. In contrast, the present invention automatically performs the necessary sifting so that if a user receives a message using the present invention, such message will be useful to them.

Message Display and Response

In step 312, the received message is displayed to the receiving client if the message has not been filtered out and/or if the message score exceeds a predetermined threshold. Messages are preferably displayed to the receiving client according to their respective score. As discussed above, the score represents a likelihood that the receiving client will find the message relevant to or within their expertise.

The receiving client then may select and respond to one of the messages. In step 314 a response from the receiving client is sent over the network 206 back to the sending client anonymously or in an encrypted format. After step 314 the preferred method ends.

Message Traffic Analysis, Categorization, and Reporting

Figure 4:
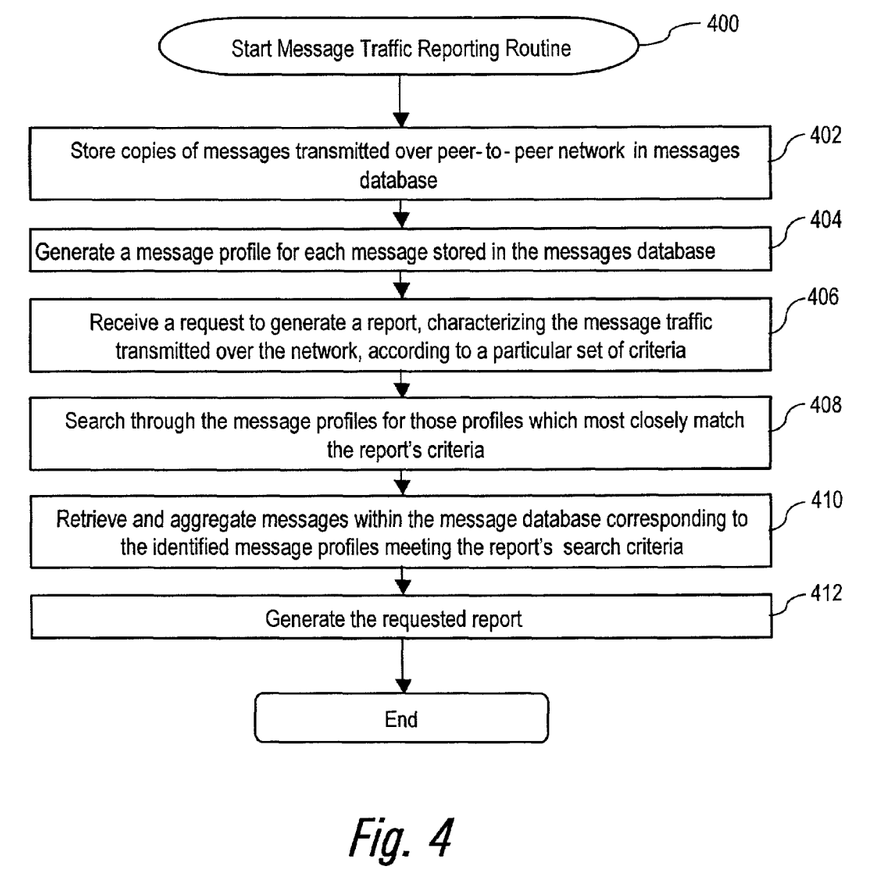
FIG. 4 is a flowchart of one embodiment of a method for message traffic analysis, categorization, and reporting.
Figure 5:
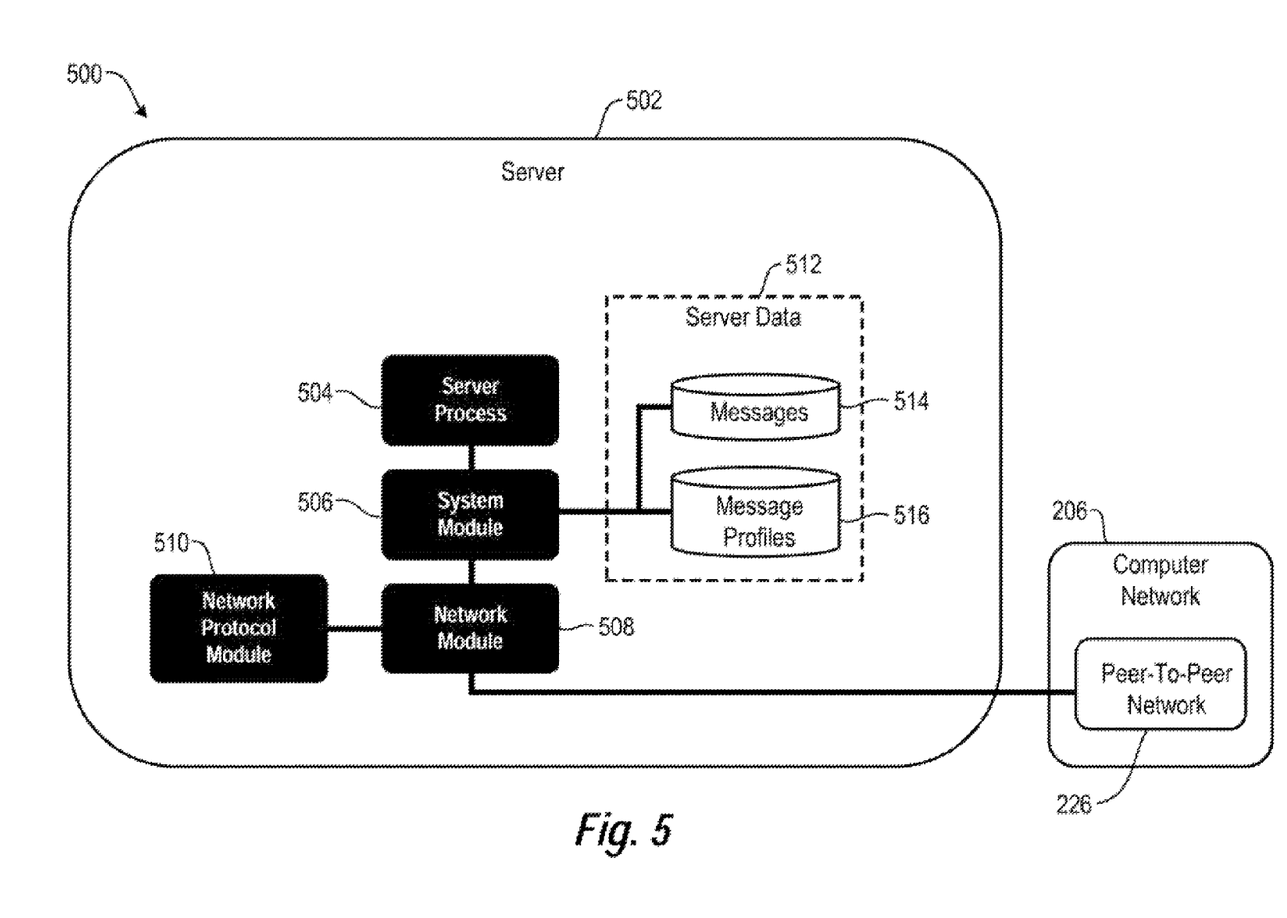
FIG. 5 is a dataflow diagram of one embodiment of a server for message traffic analysis, categorization, and reporting.

FIG. 4 is a flowchart of one embodiment of a method 400 for message traffic analysis, categorization, and reporting. FIG. 5 is a dataflow diagram 500 of one embodiment of a server 502 for message traffic analysis, categorization, and reporting. FIGS. 4 and 5 are herein discussed together. The server 502 can either be a dedicated network server, or can be one of the client computers on the network 226 which has been nominated and configured for global network benefit. Preferably only client computers having superior processing power and storage capability are so nominated. The server 502 preferably includes: a server process 504, a system module 506, a network module 508, a network protocol module 510, and messages data area 512. The messages data area 512 includes a messages database 514 and a message profile database 516.

While FIG. 5 shows only one server 502, the present invention is equally functional when the peer-to-peer network 226 is supported by multiple, globally known servers, having similar functionality. Such multiple servers enhance the present invention by providing network fault tolerance, and increased network performance over geographically diverse networks. Such redundant servers are preferably mirrored, and client computers attempting to post messages to servers which are overloaded are preferably referred to other, less utilized servers.

The method 400 begins in step 402 where the server process 504 stores copies of messages transmitted over the peer-to-peer network 226 in the messages database 514. Preferably the server process 504 extracts or assigns a date/time stamp to each stored message. Next in step 404, the server process 504 generates a message profile for each message stored in the messages database 514. The message profile is preferably generated uses the same techniques of linguistic and statistical analysis, discussed earlier in this specification. As part of message profile generation, a set of keywords and key-phrases (herein commonly defined as "key-strings") are identified within the message, as well as a frequency of occurrence for each key-string. The message profiles are stored in the message profile database 516.

In step 406, the server process 504 receives a request to generate a report characterizing the message traffic transmitted over the peer-to-peer network 226. This request may either be one of a set of fixed reports preprogrammed into the server data area 512, or may be a custom request, received over the network 206. The report request preferably includes a set of criteria which defines which messages should be included within the report and/or how messages should be categorized. Those skilled in the art know that there are almost an unlimited number of reports which may be generated from the messages stored in the message database 514.

Examples of preprogrammed fixed reports include: Frequently Asked Questions (FAQs) over a set of predefined time periods; FAQs having an inadequate number of responses (suggesting an enterprise knowledge deficiency); messages grouped by discussion topic; and recent messages grouped by their discussion topics (revealing the current "buzz" within the enterprise).

Examples of custom reports include: Frequently Asked Questions (FAQs) over a specific time periods; messages containing specific key-strings; and messages inciting less than or greater than a specific number of responses.

Such FAQ reports enable enterprises to address frequent knowledge needs on the part of specific enterprise subgroups, such as new-employees and/or new-project members. For example, new employees typically have similar questions upon first joining an enterprise, yet often said employees don't even know where to begin to look to have their questions answered. Existing employees however can grow fatigued at answering the same new employee questions over and over again. Thus, using the present invention, a new employee FAQ list can be generated and automatically sent to the new employee on their first day. Similarly, employees may join a new project team and need to come up to speed on the issues and expertise of the team. Using the present invention, a new team member FAQ list can be generated and automatically sent to the new team member, so that they may proceed through the learning curve more efficaciously.

Reports which address enterprise knowledge "deficiencies," may be particularly useful to an enterprise, as such unanswered or infrequently answered questions may represent an unmet need for knowledge within the enterprise. Such an unmet need could perhaps then be remedied, through either targeted recruitment and/or employee training.

Next in step 408, the server process 504 searches through the message profile database 516 for profiles which most closely match the report's criteria.

The criteria may include one or more of the following delimiters: message authorship information (i.e. any information available about the sending and receiving clients generating and responding to respectively transmitted messages); messages transmitted over particular time periods; messages containing particular key-strings; a frequency of message occurrence; message types (i.e. question, response, or topical); message threads; as well as any other well known delimiters used in database searching routines. The message authorship information can help generate reports which identify users who have sent or responded to a greater number of messages on a particular topic or within a particular time period. This would enable enterprises to further pinpoint areas of development and/or expertise.

Preferably the server process 504 has access to a variety of analysis tools, such as a thesaurus and dictionary, so that messages which do not explicitly meet the search criteria are nonetheless included in the requested report if they are "similar enough" to the specified criteria. The "similar enough" standard is preferably explicitly defined using well known linguistic and statistical analysis techniques, but is determined empirically, during present invention product testing.

Note that since messages are continually being added to the messages database 514, and thus the message profile database 516 is being continually updated, the server process 504 is searching through a real-time set of data and thus the requested reports will be very timely and dynamic.

In step 410, the server process 504 retrieves and aggregates messages within the message database 514 corresponding to the message profiles identified within the message profile database 516 which met the report's search criteria.

In step 412, the server process 504 generates the requested report. After step 412, the preferred method ends.

The present invention thus enables enterprises to map the scope and depth of their organizational knowledge in a very timely, repetitive, and low cost manner, which further enables enterprises to be better informed and proactive in approaching new markets and new opportunities.

Processing Information from Other Sources Using the Present Invention

While the present invention has been discussed with respect to the generation, transmission and response to messages, the present inventions' scoring functionality is equally applicable toward processing other types of information as well. Other information includes data displayed within a current web page being viewed by the user 204. A relevance vector could be generated from said web page data and compared to the user's 204 expertise vector generated from the client profile 210. User's would be notified of a particular relevance of the currently viewed web page if the relevance and expertise vectors when compared yield a score which exceeds a predetermined threshold. In this way user's browsing the web could be apprised of particular web pages which may closely align with their interests and/or expertise.

Other information similarly processed and scored may include: normal e-mail messages which have not been generated using the present inventions' functionality; files downloaded from the central server 224 or received from some other source; or expertise information stored on a central enterprise database. Those skilled in the art will know of other information sources to which the present invention may also be successfully applied.

While one or more embodiments of the present invention have been described, those skilled in the art will recognize that various modifications may be made. Variations upon and modifications to these embodiments are provided by the present invention, which is limited only by the following claims.

What is claimed is:

1. A method comprising:
generating a profile of a user on a client computer, wherein the profile of the user includes internal data describing user behavior performed on files locally stored on the client computer, and external data describing interactions of the user with a web site;
receiving, at the client computer, messages transmitted over a peer-to-peer network;
scoring, by the client computer, the received messages based on information in the profile of the user;
determining, by the client computer, whether the scores of the received messages are above a predetermined threshold;
in response to a determination that the scores of the received messages are above the predetermined threshold, presenting the received messages to the user;
profiling the received messages;
receiving a message report request, including report criteria, to characterize message traffic transmitted over the peer-to-peer network;
identifying message profiles corresponding to the report criteria;
selecting messages from the received messages corresponding to the identified message profiles; and
generating the requested messages report from the selected messages.

2. The method of claim 1, wherein the requested message report includes Frequently Asked Questions (FAQs) that occur in the messages.

3. The method of claim 1, wherein the requested message report includes unanswered or infrequently answered questions that occur in the messages.

4. The method of claim 1, wherein the requested message report identifies questions in the messages having an inadequate number of responses.

5. The method of claim 1, wherein profiling the received messages includes adding a date/time stamp to each message corresponding to when the message was transmitted on the network.

6. The method of claim 1, wherein receiving the message report request includes receiving key-string criteria; and
wherein identifying message profiles includes identifying message profiles containing the key-string criteria and synonyms of the key-string criteria.

7. The method of claim 1:
wherein receiving the message report request includes receiving criteria requesting messages transmitted during a predefined time period.

8. The method of claim 1:
wherein receiving the message report request includes receiving criteria requesting messages transmitted on a predetermined set of discussion topics.

9. The method of claim 1, further comprising:
storing copies of the received messages in a messages database.

10. The method of claim 1, further comprising:
storing the message profiles within a message profile database.

11. A system comprising:
at least one processor; and
at least one memory having machine-readable instructions that are executed to cause the at least one processor to:
generate a profile of a user, wherein the profile of the user includes internal data describing user behavior performed on stored files, and external data describing interactions of the user with a web site;
store the profile of the user;
receive messages transmitted over a network;
score the received messages based on information in the profile of the user;
determine whether the scores of the received messages are above a predetermined threshold;
in response to a determination that the scores of the received messages are above the predetermined threshold, presenting the received messages to the user;
profile the received messages;
receive a message report request, including report criteria, to characterize message traffic transmitted over the peer-to-peer network;
identify message profiles corresponding to the report criteria;
select messages from the received messages corresponding to the identified message profiles; and
generate the requested message report from the selected messages.

12. At least one non-transitory computer-readable storage medium on which is stored computer readable instructions, that when executed by at least one processor, cause at least one computer to:
generate a profile of a user, wherein the profile of the user includes internal data describing user behavior performed on stored files, and external data describing interactions of the user with a web site;
store the profile of the user;
receive messages transmitted over a network;
score the received messages based on information in the profile of the user;
determine whether the scores of the received messages are above a threshold;
in response to a determination that the scores of the received messages are above the threshold, present the received messages to the user;
profile the received messages;
receive a message report request, including report criteria, to characterize message traffic transmitted over the peer-to-peer network;
identify message profiles corresponding to the report criteria;
select messages from the received messages corresponding to the identified message profiles; and
generate the requested message report from the selected messages.

13. The non-transitory computer-readable storage medium of claim 12, wherein the computer readable instructions further cause the client computer to:
store the profile of the user remotely in an encrypted form and viewable only by the user of the client computer.

14. The non-transitory computer-readable storage medium of claim 12, wherein the received message is from an anonymous sender in a peer-to-peer network.

* * * * *